United States Patent [19]
Tawaragi et al.

[11] Patent Number: 5,471,446
[45] Date of Patent: Nov. 28, 1995

[54] OPTICAL DISK PLAYER HAVING BEAM CORRECTION MEANS

[75] Inventors: Yuji Tawaragi; Satoshi Kusano; Toshio Suzuki; Noriko Obitsu, all of Tokorozawa, Japan

[73] Assignee: Pioneer Electronic Corporation, Tokyo, Japan

[21] Appl. No.: 664,125

[22] Filed: Mar. 4, 1991

[30] Foreign Application Priority Data

Jul. 24, 1990 [JP] Japan .................... 2-195681

[51] Int. Cl.$^6$ ..................... G11B 7/00
[52] U.S. Cl. .................... 369/44.14; 369/44.29; 369/44.32; 369/44.34; 369/44.35; 369/44.36; 369/44.41
[58] Field of Search ............... 369/44.41, 124, 369/44.36, 44.34, 44.32, 44.35, 44.29

[56] References Cited

U.S. PATENT DOCUMENTS

| | | | |
|---|---|---|---|
| 4,118,736 | 10/1978 | Okada et al. | 369/12 |
| 4,497,047 | 1/1985 | Fujiie et al. | 369/44.28 |
| 4,775,967 | 10/1988 | Shimada et al. | 369/275.2 |
| 5,050,149 | 9/1991 | Ishii et al. | 369/44.36 |
| 5,050,155 | 9/1991 | Kurata et al. | 369/44.14 |
| 5,060,216 | 10/1991 | Suzuki et al. | 369/44.41 |

Primary Examiner—Georgia Y. Epps
Assistant Examiner—Nobil Hindi
Attorney, Agent, or Firm—Foley & Lardner

[57] ABSTRACT

An optical disk player having a tracking servo apparatus and a focusing servo apparatus. By amplifying a focusing error at a predetermined gain and adding it to a tracking error, the rolling which occurs due to a mass balance distortion of a pickup is electrically suppressed. Thus, an adverse influence on the tracking servo by the rolling upon focusing driving can be prevented.

6 Claims, 3 Drawing Sheets

OPTICAL DISK PLAYER HAVING BEAM CORRECTION MEANS

BACKGROUND OF THE INVENTION

1. Field of the Invention

The present invention relates to an optical disk player, and more specifically to a tracking servo apparatus in an optical disk player.

2. Description of Background Information

In optical disk players, the pickup for reading recording information on a disk-shaped recording medium, such as a video disk or the like (hereinafter, simply referred to as a disk), has an objective lens which converges an irradiation light beam as an information reading spot onto an information recording surface of the disk. An optical system, including the objective lens, is driven in a focusing direction (optical axis direction) by a focusing actuator and in a tracking direction (radial direction of the disk) by a tracking actuator.

In the pickup, when a movable section including the objective lens is driven in the focusing direction, what is called a rolling occurs if a center G of gravity of the movable part is deviated from the optical axis, which, in turn, causes a tracking error. This is equivalent to a tracking error beyond the specification limit of the disk. To prevent such an adverse effect on the tracking servo by the rolling of the pickup which is caused by a mass balance distortion, hitherto, a weight balancer is attached to the pickup body, thereby adjusting the mass balance so as to locate the center G of gravity of the movable section on the optical axis.

However, the method wherein the weight balancer is used has the drawback that use of the weight balancer obstructs the realization of downsizing, lightening of weight, and cost reduction of the pickup. In the pickup in which the downsizing and light weight are realized, there is also a problem such that a space to attach the weight balancer cannot be provided.

OBJECTS AND SUMMARY OF THE INVENTION

It is, therefore, an object of the invention to provide an optical disk player which can electrically suppress the rolling due to a mass balance distortion of a pickup by using a simple construction.

An optical disk player according to the invention comprises: a pickup including an objective lens for converging a light beam as an information reading spot onto an information recording surface of a disk; a tracking servo apparatus for producing a tracking error signal indicative of an amount of deviation in the radial direction of the disk of the information reading spot with respect to a recording track on the disk and for controlling the spot so as to shift the information reading spot in the disk radial direction in accordance with the tracking error signal; and a focusing servo apparatus for producing a focusing error signal indicative of an error in the position of the objective lens in the direction of an optical axis with respect to an in-focus position and for controlling the position of the objective lens in the optical axis direction in accordance with the focusing error signal, wherein the optical disk player has means for amplifying the focusing error signal at a predetermined gain and adding the amplified signal to the tracking error signal.

In the optical disk player according to the invention, the focusing error signal is amplified at the predetermined gain and the amplified signal is added to the tracking error signal, thereby electrically suppressing an influence on the tracking servo operation by the rolling which is caused by the mass balance distortion of the pickup.

DETAILED DESCRIPTION OF THE PREFERRED EMBODIMENT

An embodiment of the invention will be described in detail hereinbelow with reference to the drawings.

Figure 1:
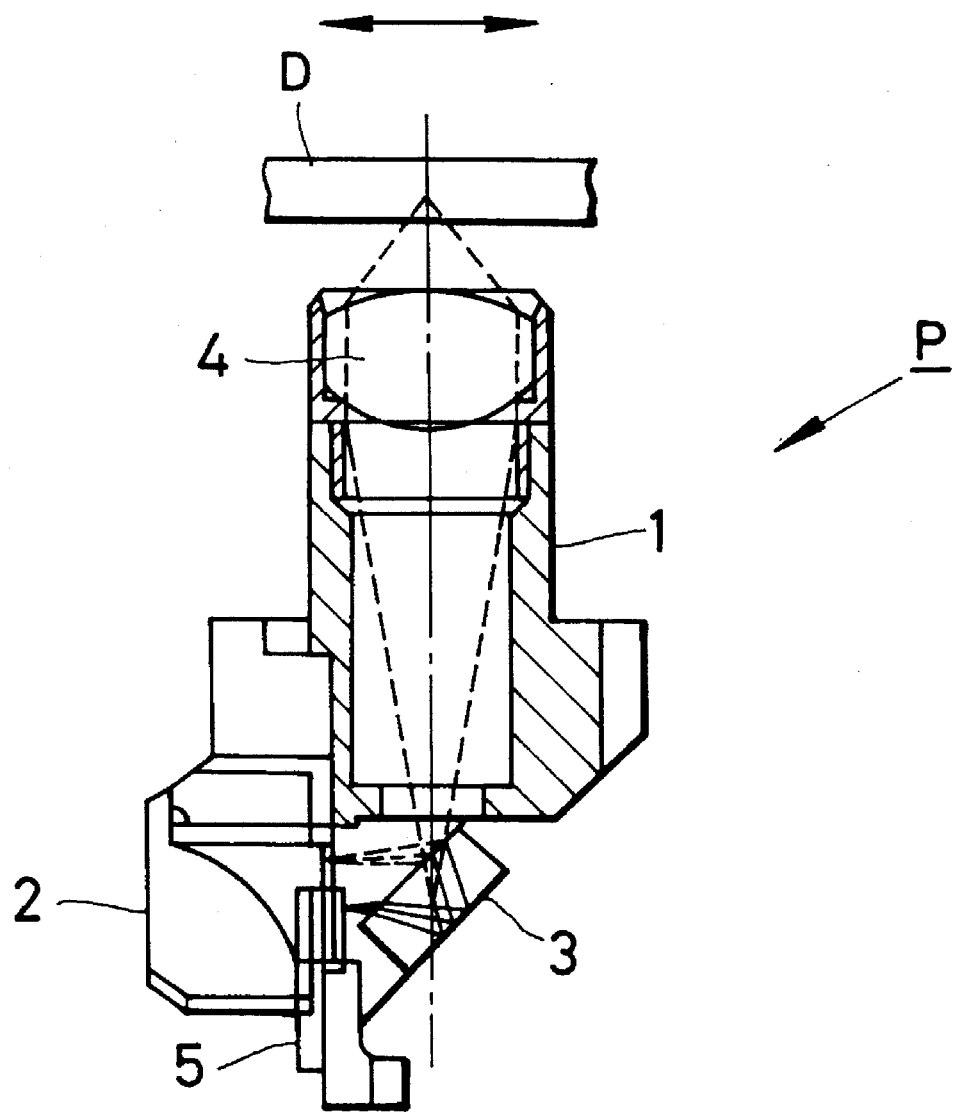
FIG. 1 is a cross sectional view showing an example of a construction of an integrated type pickup.

FIG. 1 is a cross-sectional view showing an example of the construction of a pickup P which is used in an optical disk player according to the invention. In the pickup P, a body 1 incorporates therein a laser light source 2 for generating a laser beam, a mirror 3 to reflect the laser beam in the direction of a disk D, an objective lens 4 for converging the incident laser beam onto an information recording surface of the disk D, and a photodetector 5 for detecting the reflected laser beam from the disk D which was transmitted through the objective lens 4. The laser pickup P is driven by a tracking actuator (not shown), so that the body 1 including the objective lens 4 and the photodetector 5 is integratively movable in the radial direction ( ) of the disk. On the other hand, the body 1 is driven by a focusing actuator (not shown) so as to be integratively movable in the direction of the optical axis. An example of practical constructions of such a pickup P has been described in detail in the specification of Japanese Patent Application Laid Open No. 2-135726 of the same applicant as the present invention.

Figure 2:
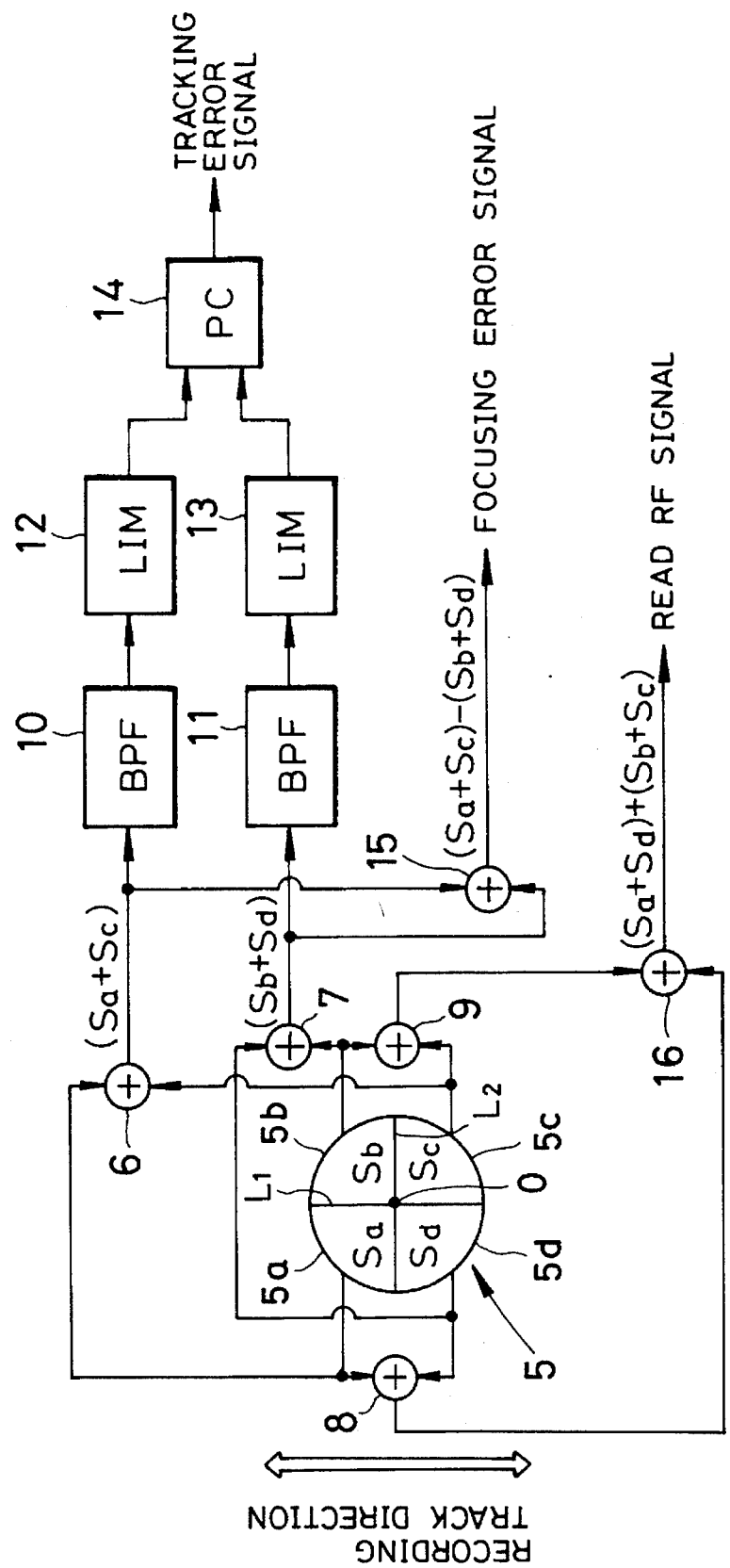
FIG. 2 is a block diagram of a circuit for producing a tracking error signal, a focusing error signal, and a read RF signal on the basis of outputs of a quadrant type photodetector.

An example of the construction of each of the producing circuits for producing the tracking error signal and focusing error signal from outputs of the photodetector 5 will now be described with reference to FIG. 2.

First, as clearly shown in the diagram, the photodetector 5 provided in the pickup P is what is called a quadrant type photodetector. It comprises four photoelectric converting elements 5a to 5d which are arranged in a manner such that a photo sensitive surface is divided into four areas by a dividing line $L_1$ along the direction of a recording track and a dividing line $L_2$ perpendicular to the dividing line $L_1$. The photodetector 5 is arranged so that a center O of the photo sensitive surface coincides with the optical axis of the reflected light beam from the disk D when the tracking state is adequate. Among the four photoelectric converting elements 5a to 5d, outputs $S_a$ and $S_c$ of the elements 5a and 5c arranged on a diagonal line are added by an adder 6, while outputs $S_b$ and $S_d$ of the elements 5b and 5d arranged likewise on a diagonal line are added by an adder 7. The outputs $S_a$ and $S_d$ of the elements 5a and 5d locating on one side of the dividing line $L_1$ are added by an adder 8. The outputs $S_b$ and $S_c$ of the elements 5b and 5c locating on the other side of the dividing line $L_1$ are added by an adder 9.

Summing outputs ($S_a+S_c$) and ($S_b+S_d$) of the adders 6 and 7 are transmitted through band pass filters (BPF) 10 and 11 and limiters (LIM) 12 and 13 and supplied to a phase comparator 14, respectively. The phase comparator 14 generates a voltage of a level which is proportional to a phase difference between both of input signals. The phase difference output is issued as a tracking error signal. A polarity and a level of the tracking error signal represent the direction of deviation and the amount of deviation, in the disk radial direction, of an information reading spot with respect to the recording track of the disk D.

The time difference detecting method is well known, in which among phase differences occurring among the outputs of the four photoelectric converting elements 5a to 5d, a phase variation component which varies in accordance with the amount of deviation, in the disk radius direction, of the information reading spot with respect to the recording track is detected. A tracking error signal is produced by the detected phase variation component (Reference is directed to Japanese Patent Application Laid Open No. 57-181433). The above-mentioned detecting method has an advantage that the deviation of the intensity distribution of the reflected light beam will hardly generate adverse effects on the servo control.

The summing outputs ($S_a+S_c$) and ($S_b+S_d$) of the adders 6 and 7 are further supplied to a subtracter 15, by which a difference between them is calculated. The differential output is generated as a focusing error signal. A polarity and a level of the focusing error signal indicate an error of the position of the objective lens 4 in the direction of the optical axis from the in-focus position, that is, the direction and distance of the separation between the objective lens 4 and the in-focus position from the information recording surface of the disk D. A method of producing the focusing error signal is well known as the astigmatism method.

On the other hand, the summing outputs ($S_a+S_d$) and ($S_b+S_c$) from the adders 8 and 9 are supplied to an adder 16, by which the sum of both outputs is calculated. The total output ($S_a+S_d$) and ($S_b+S_c$) of the outputs of the photoelectric converting elements 5a to 5d is supplied as a read RF signal to a reproduction processing system.

In the embodiment described above, the lines for dividing the surface of the photodetector are straight. However, the invention is not limited to the case where division lines are straight. For instance, as shown in Japanese Patent Application Laid Open No. 63-285732, the photodetector can be also divided by curves which are obtained by projecting straight lines on the disk which are parallel with or perpendicular to the recording tracks onto the photodetector through the objective lens, optical parts for generating an astigmatism for focusing, and the like.

Figure 3:
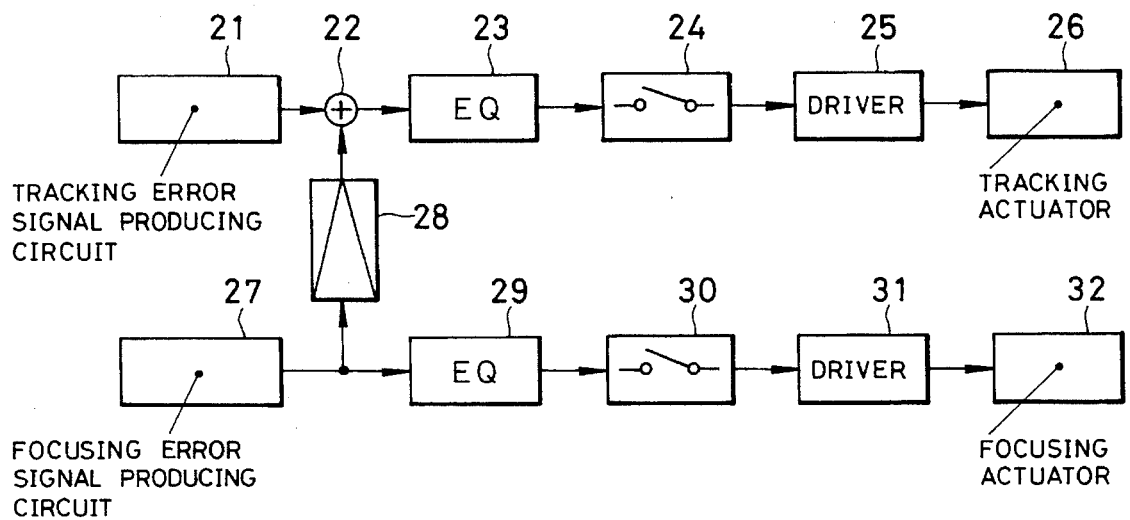
FIG. 3 is a block diagram showing an example of a tracking servo apparatus and a focusing servo apparatus which are applied to an optical disk player according to the invention.

FIG. 3 is a block diagram showing examples of a tracking servo apparatus and a focusing servo apparatus which are applied to the optical disk player according to the invention. In the diagram, a tracking error signal producing circuit 21 produces a tracking error signal, for instance, by the above-mentioned time difference detecting method. The method of producing the tracking error signal is not limited to the time difference detecting method but other producing methods such as three-beam method, push-pull method, and the like can be also used. The tracking error signal is supplied to an adder 22. Subsequently, phase and frequency characteristics of the tracking error signal are compensated by an equalizer (EQ) 23. An output signal of the EQ 23 is transmitted through a loop switch 24 and a driver 25 to a tracking actuator 26 as a driving signal.

On the other hand, a focus error signal producing circuit 27 produces a focusing error signal, for instance, by the above-mentioned astigmatism method. The method of producing the focusing error signal is not limited to the astigmatism method but other producing methods such as a critical angle detecting method and the like can be also used. The focusing error signal is supplied to the adder 22 through a variable gain amplifier 28 and is added to the tracking error signal at a predetermined gain. Phase and frequency characteristics of the focusing error signal are compensated by an equalizer (EQ) 29. Subsequently, an output signal of the EQ 29 is supplied as a driving signal to a focusing actuator 32 through a loop switch 30 and a driver 31.

As mentioned above, by amplifying the focusing error signal at a predetermined gain and adding to the tracking error signal, the rolling which would occur due to a mass balance distortion of the pickup P can be electrically suppressed. Thus, a tracking deviation due to the rolling when the body 1 (refer to FIG. 1) of the pickup P is driven in the focusing direction can be prevented and "playability" can be improved.

Figure 4:
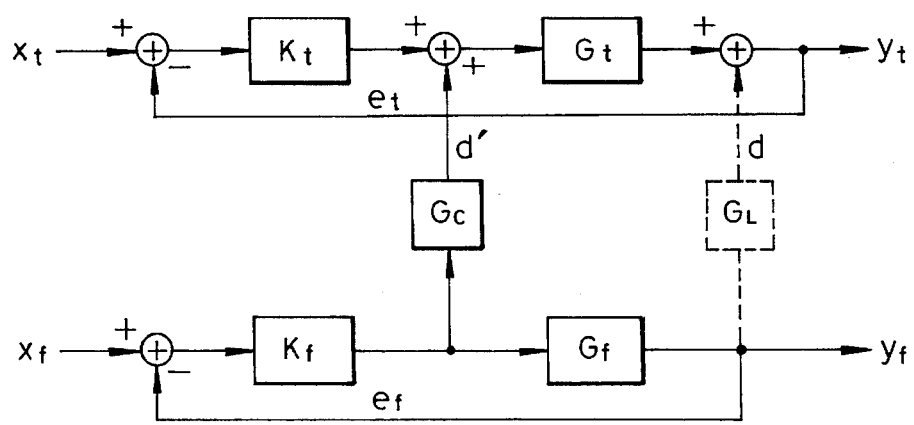
FIG. 4 is a block diagram showing each servo loop.

A theory in which the playability can be improved by adding the focusing error signal to the tracking error signal at a predetermined gain will now be described with reference to a block diagram of FIG. 4 showing each servo loop.

In FIG. 4, $x_t$ and $y_t$ represent an input and an output of a tracking variation amount; $x_f$ and $y_f$ represent an input and an output of a focusing variation amount; $e_t$ represents a tracking error signal level; $e_f$ represents a focusing error signal level; d represents a disturbance; d' represents a correction signal; $K_t$ represents a sensitivity of a tracking error comparator; $G_t$ represents a transfer function of the equalizer and tracking actuator; $K_f$ represents a sensitivity of a focusing error comparator; $G_f$ represents a transfer function of the equalizer and focusing actuator; $G_C$ represents a correction coefficient; and $G_L$ represents a disturbance transfer function, respectively. The disturbance d corresponds to a dynamic tracking error component which is generated upon focusing when the mass balance of the pickup P is not obtained.

The case where a focusing fluctuation acts as a motion in the tracking direction will be first considered. The output $y_t$ of the tracking fluctuation amount and the tracking error level $e_t$ are obtained by the following equations.

$$y_t = \frac{K_t G_t}{1+K_t G_t} x_t + \frac{G_t}{1+K_t G_t} d' + \frac{1}{1+K_t G_t} d \quad (1)$$

$$e_t = \frac{K_t}{1+K_t G_t} x_t - \frac{K_t G_t}{1+K_t G_t} d' - \frac{K_t}{1+K_t G_t} d \quad (2)$$

Assuming that $d'=-d/G_t$, the terms of the disturbance d are set off in both equations of $y_t$ and $e_t$.
On the other hand, $$d'=e_f G_C, \ d=e_f G_f G_L$$

and from the equations (1) and (2), it is sufficient to set:

$$d'=-d/G_t$$

Therefore, $$e_f G_C = -e_f G_f G_L/G_t$$

$$\therefore G_C = G_L \cdot (G_f/G_t)$$

In a region (100 to 1 kHz) where a focusing gain value of the disk is high, both of $G_f$ and $G_t$ have frequency characteristics of −12 dB/oct and $G_f/G_t$ becomes a constant.

Furthermore, as a result of the actual measurement, it has been confirmed that $G_L$ is almost constant. Therefore, $G_C$ can be handled as a simple constant.

As will be obviously understood from the above description, by adding a signal, which is a constant, times a multiple of the focusing error signal to the tracking error signal, the playability can be improved.

The invention is not limited to the pickup of the foregoing type in which the objective lens and the photodetector are integrated. It will be obviously understood that the invention can be also applied to a pickup of the type in which the objective lens and the photodetector are separately provided.

As described above, in the optical disk player according to the invention, the focusing error signal is amplified to a predetermined gain and added to the tracking error signal, thereby electrically suppressing the rolling which occurs due to the mass balance distortion of the pickup. Therefore, adverse effects of the rolling upon focusing driving on the tracking servo can be prevented and the playability can be improved.

What is claimed is:

1. An optical disk drive system, comprising:

a source for producing a light beam;

an information pick up having a body;

a lens for converging the light beam on an information reading spot on the recording surface of a disk-shaped optical recording medium, the lens being immoveable with respect to the body;

a tracking servo means for producing a tracking error signal indicating the amount of radially directed deviation of the light beam from the information reading spot and for shifting the information pick up in a radial direction an amount corresponding to the tracking error signal;

a focusing servo means for producing a focusing error signal indicative of an error in the position of the information pick up along the optical axis of the disk drive system and for shifting the information pick up along the optical axis an amount corresponding to the focusing error signal;

amplifying means for amplifying said focusing error signal at a predetermined gain; and adding means for adding said focusing error signal amplified by said amplifying means to the tracking error signal.

2. The optical disk drive system of claim 1, in which the light beam is a laser beam.

3. The optical disk drive system of claim 1, in which said amplifying means is a variable gain amplifier.

4. The optical disk drive system of claim 3, in which the adder adds the output of the variable gain amplifier to the tracking error signal.

5. The optical disk drive system of claim 1, in which the converged light beam impinges on a photodetector, the focusing and tracking servo means deriving error signals from the position of the light beam incident on the photodetector.

6. The optical disk drive system of claim 5, in which the photodetector is divided into four discrete light beam receiving sectors.

* * * * *